United States Patent
Zhou et al.

(10) Patent No.: US 12,294,773 B2
(45) Date of Patent: May 6, 2025

(54) METHOD AND APPARATUS FOR GENERATING VIDEO DIGEST AND READABLE STORAGE MEDIUM

(71) Applicant: SHENZHEN MICROBT ELECTRONICS TECHNOLOGY CO., LTD., Guangdong (CN)

(72) Inventors: Chengtao Zhou, Guangdong (CN); Le Zhang, Guangdong (CN); Zuoxing Yang, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/710,957

(22) PCT Filed: Apr. 24, 2023

(86) PCT No.: PCT/CN2023/090361
§ 371 (c)(1),
(2) Date: May 16, 2024

(87) PCT Pub. No.: WO2023/231647
PCT Pub. Date: Dec. 7, 2023

(65) Prior Publication Data
US 2024/0334027 A1    Oct. 3, 2024

(30) Foreign Application Priority Data
Jun. 1, 2022 (CN) .......................... 202210614997.4

(51) Int. Cl.
*H04N 21/8549* (2011.01)
*H04N 21/44* (2011.01)

(52) U.S. Cl.
CPC ... *H04N 21/8549* (2013.01); *H04N 21/44008* (2013.01)

(58) Field of Classification Search
CPC ..................... H04N 21/8549; H04N 21/44008
(Continued)

(56) References Cited

U.S. PATENT DOCUMENTS

| | | | |
|---|---|---|---|
| 2003/0061612 | A1 | 3/2003 | Lee et al. |
| 2004/0136460 | A1 | 7/2004 | Zhang et al. |

(Continued)

FOREIGN PATENT DOCUMENTS

| | | | |
|---|---|---|---|
| CN | 101582063 | A | 11/2009 |
| CN | 102184221 | A | 9/2011 |

(Continued)

OTHER PUBLICATIONS

English Translation of Chinese Publication CN108776676 (Year: 2018).*

(Continued)

*Primary Examiner* — Loi H Tran
(74) *Attorney, Agent, or Firm* — Dickinson Wright PLLC

(57) ABSTRACT

A method and an apparatus for generating a video digest, and a readable storage medium are provided. The method is applied to a video acquisition device that includes a hardware unit configured to obtain movement information in real time, the movement information includes speed information and direction information of the video acquisition device. The method includes: starting acquisition of a video signal in response to an acquisition start instruction, and recording movement information corresponding to each frame during the acquisition of the video signal; determining a frequency for key frame extraction according to the movement information corresponding to each frame; determining a key frame from the acquired video signal according to the frequency for key frame extraction; and in response to an acquisition end instruction, generating a video digest according to the key frame.

10 Claims, 2 Drawing Sheets

(58) Field of Classification Search
USPC .......................................................... 386/241
See application file for complete search history.

(56) References Cited

U.S. PATENT DOCUMENTS

| | | |
|---|---|---|
| 2005/0226331 A1 | 10/2005 | Mohamed et al. |
| 2014/0072284 A1 | 3/2014 | Avrahami et al. |
| 2020/0227089 A1* | 7/2020 | Xiao ...................... H04N 5/911 |
| 2021/0065427 A1* | 3/2021 | Wade ..................... G06V 20/20 |
| 2022/0124241 A1* | 4/2022 | Manzari ................. H04N 5/262 |
| 2023/0069018 A1* | 3/2023 | Shiroshima ............ G01B 11/00 |

FOREIGN PATENT DOCUMENTS

| | | |
|---|---|---|
| CN | 102819528 A | 12/2012 |
| CN | 107230187 A | 10/2017 |
| CN | 107330000 A | 11/2017 |
| CN | 110662044 A | 1/2020 |
| CN | 114201644 A | 3/2022 |
| CN | 114697764 A | 7/2022 |

OTHER PUBLICATIONS

English Translation of Chinese Publication CN114245232 (Year: 2022).*

English Translation of Chinese Publication CN108089958, Jun. 2021 (Year: 2021).*

* cited by examiner

METHOD AND APPARATUS FOR GENERATING VIDEO DIGEST AND READABLE STORAGE MEDIUM

CROSS-REFERENCE TO RELATED APPLICATIONS

This application is a National Stage application of International Application No. PCT/CN2023/090361, filed Apr. 24, 2023, which claims the benefit of Serial No. 202210614997.4, filed on Jun. 1, 2022 in China, and which applications are incorporated herein by reference. To the extent appropriate, a claim of priority is made to each of the above disclosed applications.

TECHNICAL FIELD

The present disclosure relates to a technical field of video processing, and in particular, to a method and an apparatus for generating a video digest, and a readable storage medium.

BACKGROUND

Application of cameras becomes more and more widely, and accordingly a large quantity of videos is generated. A user may waste a lot of time when browsing a recorded video. Generating a video digest has become an important technique to save the time the user spends on browsing the recorded video.

An existing method for generating a video digest typically includes, after video recording is completed, analyzing the video signal frame by frame, extracting features of each frame, and analyzing a similar feature and a varying feature of the video content so as to find a key frame that is able to indicate a primary content of the video. Not only significant computing power is required to analyze the video signal, but also generation of the video digest is slow. In addition, if the video has poor quality, accuracy of extracted features is further affected, which in turn affects quality of the generated video digest.

SUMMARY

Embodiments of the present disclosure provide a method and an apparatus for generating a video digest, and a readable storage medium, which may generate the video digest online and increase efficiency and quality of the generation of the video digest.

In a first aspect, an embodiment of the present disclosure provides a method for generating a video digest. The method is applied to a video acquisition device. The video acquisition device includes a hardware unit configured to obtain movement information in real time. The movement information includes speed information and direction information of the video acquisition device. The method includes: starting acquisition of a video signal in response to an acquisition start instruction, and recording movement information corresponding to each frame during the acquisition of the video signal; determining, according to the movement information corresponding to each frame, a frequency for key frame extraction; determining, according to the frequency for key frame extraction, a key frame from the acquired video signal; and in response to an acquisition end instruction, generating a video digest according to the key frame.

In a second aspect, an embodiment of the present disclosure provides an apparatus for generating a video digest. The apparatus is applied to a video acquisition device. The video acquisition device includes a hardware unit configured to obtain movement information in real time. The movement information includes speed information and direction information of the video acquisition device. The apparatus includes: an acquisition recording module, configured to start acquisition of a video signal in response to an acquisition start instruction and record movement information corresponding to each frame during the acquisition of the video signal; a frequency determining module, configured to determine, according to the movement information corresponding to each frame, a frequency for key frame extraction; a key frame determining module, configured to determine, according to the frequency for key frame extraction, a key frame from the acquired video signal; and a digest generation module, configured to: in response to an acquisition end instruction, generate a video digest according to the key frame.

In a third aspect, an embodiment of the present disclosure provides a machine-readable medium having instructions stored thereon. The instructions, when executed by one or more processors of an apparatus, cause the apparatus to perform the method for generating a video digest according to one or more of the foregoing aspects.

The embodiments of the present disclosure provide the following advantages.

The method for generating a video digest provided in the embodiments of the present disclosure is applicable to a video acquisition device. Upon receiving an acquisition start instruction, the video acquisition device starts acquisition of a video signal in response to the acquisition start instruction, and records movement information corresponding to each frame during the acquisition of the video signal. Therefore, a key frame may be determined in real time according to the movement information corresponding to each frame. Upon receiving an acquisition end instruction, the video acquisition device may directly generate a video digest according to the determined key frame in response to the acquisition end instruction. In this process, it is not required to analyze the video signal frame by frame and extract video features. Therefore, computing complexity may be reduced, computation may be decreased, and efficiency of generation of the video digest may be improved. The problem of inaccurate feature extraction due to the video quality may also be avoided, and the quality of the generated video digest may be guaranteed. In addition, in the embodiments of the present disclosure, in determining the key frame real-time, the frequency for key frame extraction is dynamically determined according to the movement information of the video acquisition device, so that the dynamically determined frequency for key frame extraction is more consistent with variations of the movement of the video acquisition device, and the determination of the key frame may be more accurate, thereby further improving the quality of the generated video digest. Further, the key frame is determined in real time by the video acquisition device during acquisition of the video signal, so the video digest may be generated upon completion of the acquisition of the video signal. Compared with the method in which the video digest is generated offline by analyzing the video signal frame by frame after acquisition of the whole video signal is completed, the embodiments of the present disclosure allow online generation of the video digest and may satisfy a user demand for generating the video digest in real time.

BRIEF DESCRIPTION OF THE DRAWINGS

For clear description of technical solutions of embodiments of the present disclosure, accompanying drawings required for describing the embodiments of the present disclosure are described in the following. Apparently, the accompanying drawings described in the following are merely some of the embodiments of the present disclosure. A person of ordinary skill in the art may derive other drawings from these accompanying drawings without paying inventive efforts.

DETAILED DESCRIPTION

Technical solutions in the embodiments of the present disclosure are clearly and thoroughly described with reference to the accompanying drawings of the embodiments of the present disclosure. Apparently, the described embodiments are some rather than all of the embodiments of the present disclosure. All other embodiments obtained by a person of ordinary skill in the art based on the embodiments of the present disclosure without paying inventive efforts shall fall within the protection scope of the present disclosure.

The terms "first" and "second" in the description and claims of the present disclosure are used to distinguish similar objects, instead of defining a specific sequence or order. It is to be understood that data used in this way is exchangeable as appropriate, so that the embodiments of the present disclosure described herein may be implemented in an order different from the order shown or described herein. In addition, objects distinguished by "first" and "second" are generally of a same type, and the quantity of the objects is not limited. For example, there may be one first object, or a plurality of first objects. In addition, the term "and/or" in the description and claims are used to describe an association relationship between associated objects, which indicates there might exist three relationships. For example, A and/or B may indicate the following cases: only A exists, both A and B exist, and only B exists. The character "/" usually indicates an "or" relationship between the associated objects. In the embodiments of the present disclosure, the term "a plurality of" means two or more, and other quantifiers have similar functions.

Figure 1:
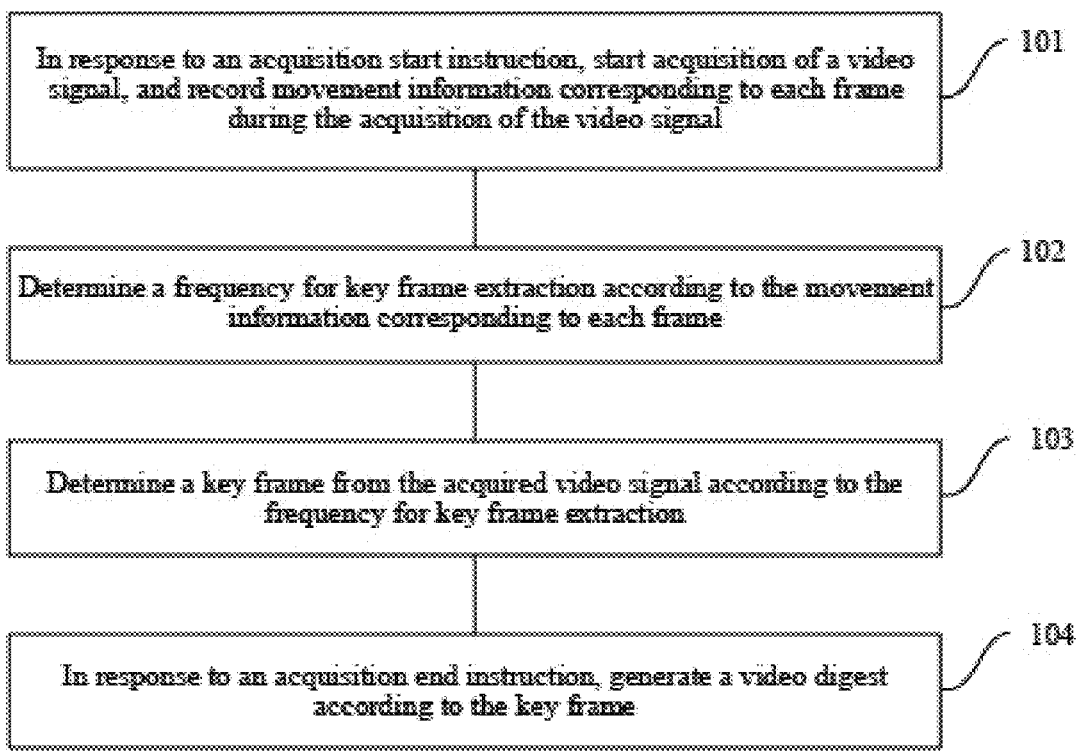
FIG. 1 is a flowchart of steps of a method for generating a video digest according to an embodiment of the present disclosure.

Reference is made to FIG. 1, a flowchart of steps of a method for generating a video digest according to an embodiment of the present disclosure is illustrated. The method may be applied to a video acquisition device. The video acquisition device includes a hardware unit configured to obtain movement information in real time. The movement information includes speed information and direction information of the video acquisition device. The method may include the following steps:

Step 101: starting acquisition of a video signal in response to an acquisition start instruction, and recording movement information corresponding to each frame (referring to each frame of the video signal) during the acquisition of the video signal;

Step 102: determining, according to the movement information corresponding to each frame, a frequency for key frame extraction;

Step 103: determining, according to the frequency for key frame extraction, a key frame from the acquired video signal; and Step 104: in response to an acquisition end instruction, generating a video digest according to the key frame.

The method for generating the video digest provided in the embodiments of the present disclosure may be applied to a video acquisition device. The video acquisition device may be any device having a video acquisition function, such as an in-vehicle recorder, a wearable device having a camera, or the like.

The video acquisition device includes a hardware unit configured to obtain movement information in real time. The hardware unit may be a built-in unit or an external unit of the video acquisition device. The hardware unit may obtain the movement information of the video acquisition device in real time. The movement information includes, but is not limited to, speed information and direction information of the video acquisition device.

It should be noted that a specific type of the hardware unit is not limited in the embodiments of the present disclosure. For example, the hardware unit may include an Inertial Measurement Unit (IMU) and a gyrosensor. The IMU may be used to provide the speed information and the gyrosensor may be used to provide the direction information.

The IMU may measure an acceleration of an object. The speed information of the video acquisition device may be obtained according to the acceleration of the video acquisition device as measured by the IMU. For example, in a case that the acceleration of the video acquisition device as measured by the IMU at a particular time point is a, the speed of the video acquisition device at that time point is v=v0+a*t, where v0 is an initial speed of the video acquisition device (which is generally 0) and t is a time for which the video acquisition device has been moving.

The gyrosensor may measure accelerations of an object in three directions x, y, and $z$. The direction information of the video acquisition device may be obtained according to the accelerations of the video acquisition device in the three directions x, y, and $z$ as measured by the gyrosensor. Further, according to information about variations of the accelerations of the video acquisition device in the three directions of x, y, and $z$, it may be determined as to whether the video acquisition device has made a turn. For example, if the acceleration of the video acquisition device in the $z$ direction has suddenly increased and then decreased, it may be determined that the video acquisition device has made one urn.

With the method for generating the video digest provided in the embodiments of the present disclosure, the video digest may be generated fast and in real time during the movement of the video acquisition device, according to the video signal acquired by the video acquisition device and the movement information of the video acquisition device.

The acquisition start instruction is used for triggering the video acquisition device to start acquisition of the video signal. The acquisition end instruction is used for triggering the video acquisition device to stop acquisition of the video signal.

Upon receiving the acquisition start instruction, the video acquisition device starts acquisition of the video signal in response to the acquisition start instruction, and records, during the acquisition of the video signal, the movement information corresponding to each frame (referring to each frame of the video signal) according to the speed information provided by the IMU and the direction information provided by the gyrosensor. That is, for each acquired frame of the video signal, the movement information of the video acquisition device associated with a time at which that frame of video signal is acquired may be recorded.

Further, during the acquisition of the video signal, the video acquisition device may record a mapping between identification information of each frame of the video signal and the movement information of the video acquisition device. In this way, during determining of a key frame, identification information of the key frame may be determined. Upon completion of the video acquisition, all key frames may be extracted from all acquired video signals according to the determined identification information of the key frames. The video digest may be obtained by splicing and combining all the extracted key frames. The identification information may be an acquisition time point corresponding to each frame, or the identification information may be a frame sequence number corresponding to each frame, which is not limited in the embodiment of the present disclosure.

The movement information may change during the movement of the video acquisition device. For example, during running of a user, who is carrying a wearable device, a video signal may be acquired by the wearable device. A running speed of the user may sometimes increase and sometimes decrease. The user may further control the video acquisition device (the wearable device) to make turn(s) during running. Such a turn may include instances of head turning and/or steering. Ahead turning refers to a change in a photographing direction (including a change in the up, down, left, or right directions or the like) of the video acquisition device, with a direction of the movement unchanged. For example, during running of the user carrying the wearable device, the wearable device photographs a scene in a forward direction (for example, a running direction of the user). At a particular moment, the user turns the video acquisition device (the wearable device) to a left side of the user to photograph the scene on his left side, while the user continues running in the original forward direction. In this case, turning has occurred once (specifically, head turning has occurred once). Steering refers to a change in the direction of the movement of the video acquisition device. During steering, the photographing direction may change accordingly as the movement direction changes. Head turning and steering may occur separately or simultaneously. Similarly, video signals may be acquired by an in-vehicle recorder during driving of the user. A driving speed of the user may sometimes increase and sometimes decrease, and instances of steering may occur.

During the movement of the video acquisition device, if the key frames are extracted at a fixed frequency (for example, the video acquisition device extracts key frames at a same frequency when a user runs versus when the user drives through a same distance), an quantity of extracted key frames may be insufficient when the user drives, such that the key frames may not accurately express the primary content of the video, thereby affecting the quality of the generated video digest. In another example, if the video acquisition device has always been photographing in a particular direction, the acquired video signal is relatively similar. However, if the video acquisition device make turn(s) (for example, head turning and/or steering), the scene photographed by the video acquisition device typically changes significantly. In this scenario, if key frames are extracted at a fixed frequency, the quantity of key frames extracted when the turning occurs may be insufficient, such that the key frames may not accurately express the primary content of the video, thereby affecting the quality of the generated video digest.

To solve the problem(s), in the embodiments of the present disclosure, during acquisition of the video signal by the video acquisition device, movement information corresponding to each frame is recorded, a frequency for key frame extraction is determined according to the movement information corresponding to each frame, and a key frame is determined from the acquired video signal according to the frequency for key frame extraction. For example, when a moving speed of the video acquisition device is large, a high frequency for key frame extraction may be used. As such, more key frames may be extracted in a same period of time if the moving speed is large, thereby ensuring the generated video digest may accurately express the primary content of the video. In contrast, when the moving speed of the video acquisition device is low, a low frequency for key frame extraction may be used. As such, fewer key frames may be extracted in that same period of time if the moving speed is low, thereby reducing information redundancy while ensuring the generated video digest may accurately express the primary content of the video.

In a specific implementation, upon receiving an acquisition start instruction, the video acquisition device starts acquisition of the video signal in response to the acquisition start instruction, and records movement information corresponding to each frame during the acquisition of the video signal, so as to determine a key frame (for example, determine an acquisition time point and/or a frame sequence number corresponding to the key frame) in real time according to the movement information corresponding to each frame. Upon receiving an acquisition end instruction, the video acquisition device, in response to the acquisition end instruction, directly extracts the key frames according to the acquisition time points and/or the frame sequence numbers corresponding to the determined key frames and generate the video digest. In this process, it is not required to analyze the video signal frame by frame and extract video features, which may decrease computation and increase efficiency of generation of the video digest. The problem of inaccurate feature extraction due to video quality may also be avoided, and the quality of the generated video digest may be guaranteed. Further, the key frame is determined in real time by the video acquisition device during acquisition of the video signal, so the video digest may be generated upon completion of the acquisition of the video signal. Compared with the method in which the video digest is generated offline by analyzing the video signal frame by frame after acquisition of the whole video signal is completed, the embodiments of the present disclosure allow online generation of the video digest and may satisfy a user demand for generating the video digest in real time.

In an optional embodiment of the present disclosure, determining the frequency for key frame extraction according to the movement information corresponding to each frame in step 102 may include: determining the frequency for key frame extraction according to the speed information or the direction information corresponding to each frame.

In an optional implementation, in the embodiments of the present disclosure, the frequency for key frame extraction may be determined according to the speed information corresponding to each frame. For example, the frequency for key frame extraction may be proportional to the speed information. A higher speed corresponds to a higher frequency for key frame extraction. To the contrary, a lower speed corresponds to a lower frequency for key frame extraction. If the speed is 0, the frequency for key frame extraction may be zero or close to zero. Certainly, a correspondence between a value of the frequency for key frame extraction and a value of the speed information may be set according to actual needs, which is not limited in the embodiments of the present disclosure. Optionally, the speed information may be divided into different intervals, and different key frame extraction frequencies are set for the different intervals, so that the frequency for key frame extraction may be determined according to an interval to which the speed information belongs.

In another optional implementation, in the embodiments of the present disclosure, the frequency for key frame extraction may be determined according to the direction information corresponding to each frame. For example, a default frequency for key frame extraction may be set. Upon detection of a change in the direction information, if the video acquisition device may be determined, according to the change of the direction information, to be making a turn (for example, head turning and/or steering), the default frequency for key frame extraction may be increased, so that more key frames may be extracted during the turn.

It should be noted that, in the embodiments of the present disclosure, the frequency for key frame extraction corresponding to each frame may be determined according to the movement information corresponding to said each frame of video signal acquired in real time, and further a key frame is determined for the acquired video signal in real time. However, in an actual application, the movement information of the video acquisition device may remain in a same or similar state for a period of time. Therefore, in the embodiments of the present disclosure, the key frame is periodically determined from the acquired video signal during the movement of the video acquisition device.

In an optional embodiment of the present disclosure, determining a frequency for key frame extraction according to the movement information corresponding to each frame in step 102 may include:
Step S11: when a preset cycle arrives, obtaining movement information corresponding to each frame within the preset cycle; and
Step S12: determining a frequency for key frame extraction within the preset cycle according to the movement information corresponding to each frame within the preset cycle.

Upon receiving the acquisition start instruction, the video acquisition device starts acquisition of a video signal in response to the acquisition start instruction, and records movement information corresponding to each frame during the acquisition of the video signal. When a preset cycle arrives, the video acquisition device obtains movement information corresponding to each frame within the preset cycle, determines a frequency for key frame extraction within the preset cycle according to the movement information corresponding to each frame within the preset cycle, and records identification information (for example, an acquisition time point or a frame sequence number) of key frames within the preset cycle. A next preset cycle is then entered. In the embodiments of the present disclosure, key frames are determined periodically, so that computation of the video acquisition device may be reduced while real-time generation of the video digest is guaranteed.

Further, the preset cycle may include a preset time cycle or a preset distance cycle.

For example, the preset cycle is a preset time cycle. Assuming that the preset time cycle is 5 seconds, the video acquisition device determines, every 5 seconds during the acquisition of the video signal, a key frame from the video signal acquired within the 5 seconds, and records the identification information of the determined key frame.

For example, the preset cycle is a preset distance cycle. Assuming that the preset distance cycle is 10 meters, the video acquisition device determines, every 10 meters during the acquisition of the video signal, a key frame from the video signal that is acquired within a time for which a distance of 10 meters is moved, and records the identification information of the determined key frame.

In an optional embodiment of the present disclosure, the movement information may further include position information of the video acquisition device. The preset distance cycle may be determined according to the position information corresponding to each frame.

For example, the video acquisition device may further include a hardware unit configured to obtain position information in real time, such as a Global Positioning System (GPS) unit, which may be used to obtain the position information of the video acquisition device in real time. The GPS unit may be a built-in unit or an external unit of the video acquisition device.

In the embodiments of the present disclosure, a distance by which the video acquisition device moves may be determined according to the position information corresponding to each frame. Upon a determination that the distance by which the video acquisition device has moved reaches a distance corresponding to the preset distance cycle, it may be considered that the preset cycle has arrived.

In an optional embodiment of the present disclosure, determining a key frame from the acquired video signal according to the frequency for key frame extraction in step 103 may include:
Step S21: determining a frame extracting quantity within the preset cycle according to the preset cycle and the frequency for key frame extraction within the preset cycle; and
Step S22: determining, from a start frame to an end frame of the preset cycle, key frames of the frame extracting quantity.

Upon receiving the acquisition start instruction, the video acquisition device starts acquisition of a video signal in response to the acquisition start instruction, and records movement information corresponding to each frame during the acquisition of the video signal. When a preset cycle arrives, the video acquisition device obtains movement information corresponding to each frame within the preset cycle, and determines a frequency for key frame extraction within the preset cycle according to the movement information corresponding to each frame within the preset cycle. In the example of the preset distance cycle, assuming that the preset distance cycle is s meters, when a moving distance reaches s meters, the video acquisition device obtains movement information corresponding to each frame of video signal acquired within the time of moving the distance of s meters, and determines a frequency for key frame extraction within the preset cycle according to the obtained movement information corresponding to each frame. It is assumed that the frequency for key frame extraction within the preset cycle is determined to be f1 frames/100 meters. A frame extracting quantity within the preset cycle may be determined according to the preset cycle and the frequency for key frame extraction within the preset cycle. Specifically, a product of the preset cycle and the frequency for key extraction is the frame extracting quantity within the preset cycle. That is, the frame extracting quantity within the preset cycle is s*f1*0.01 frames. Key frames, of the quantity of s*f1*0.01, may be determined from a start frame to an end frame within the preset cycle. Assuming that a total of n frames of video signals are included between the start frame and the end frame within the preset cycle (that is, the video acquisition device acquires a total of n frames of the video signal within the moving distance of s meters), s*f1*0.01 frames may be determined from the n frames, as the key frames. For example, the s*f1*0.01 frames may be uniformly selected from the n frames, as the key frames.

It may be understood that the preset cycle may alternatively be a preset time cycle. Assuming that the preset time cycle is t seconds and the frequency for key frame extraction in the preset cycle is f2 frames/100 seconds, it may be determined that the frame extracting quantity within the preset cycle is t*f2*0.01 frames.

In an optional embodiment of the present disclosure, determining a frequency for key frame extraction according to the movement information corresponding to each frame in step 102 may include:

Step S31: setting an initial frequency for key frame extraction, which corresponds to a default speed interval; and Step S32: upon detection of a first change frame, updating the initial frequency for key frame extraction according to speed information corresponding to the first change frame, where the first change frame refers to a frame for which the speed information goes outside of the default speed interval.

Upon receiving the acquisition start instruction, the video acquisition device starts acquisition of a video signal in response to the acquisition start instruction, and records movement information corresponding to each frame during the acquisition of the video signal. In this case, an initial frequency for key frame extraction may be set, which corresponds to a default speed interval. The default speed interval may be set in advance based on experience.

During the acquisition of the video signal, the video acquisition device may detect in real time whether a first change frame exists. Upon detection of the first change frame, which indicates that the speed information of the video acquisition device changes significantly, the initial frequency for key frame extraction may be updated according to the speed information corresponding to the first change frame. The first change frame refers to a frame for which the speed information goes outside of the default speed interval. For example, upon detection that the speed information exceeds the default speed interval, the initial frequency for key frame extraction may be increased. Upon detection that the speed information falls below the default speed interval, the initial frequency for key frame extraction may be decreased.

Optionally, the default speed interval may be set according to a video acquisition scenario, and different video acquisition scenarios may correspond to different default speed intervals. For example, the default speed interval may be set as a1 km/hour to b1 km/hour for a video acquisition scenario during running. For a video acquisition scenario during driving, the default speed interval may be set as a2 km/hour to b2 km/hour, and b1 may be less than a2.

It may be understood that, after updating the initial frequency for key frame extraction according to the speed information corresponding to the first change frame, the video acquisition device continues detecting in real time whether the first change frame exists, and upon detection of the first change frame, the video acquisition device may update the current frequency for key frame extraction according to the speed information corresponding to the first change frame. That is, in the embodiments of the present disclosure, the frequency for key frame extraction is updated in real time according to the speed change of the video acquisition device, so that the currently used frequency for key frame extraction is consistent with the current speed information of the video acquisition device, and the key frames may be more accurately determined, thereby improving the quality of the generated video digest.

In an optional embodiment of the present disclosure, updating the initial frequency for key frame extraction according to the speed information corresponding to the first change frame in step S32 may include:

if the speed information corresponding to the first change frame is greater than a maximum value in the default speed interval, increasing the initial frequency for key frame extraction; or if the speed information corresponding to the first change frame is less than a minimum value in the default speed interval, decreasing the initial frequency for key frame extraction.

Upon receiving the acquisition start instruction, the video acquisition device starts acquisition of a video signal in response to the acquisition start instruction, and records movement information corresponding to each frame during the acquisition of the video signal. In this case, the initial frequency for key frame extraction may be set, which corresponds to the default speed interval. During the acquisition of the video signal, the video acquisition device may detect in real time whether a first change frame exists. If the first change frame is detected and the speed information corresponding to the first change frame is greater than a maximum value in the default speed interval (in the example where the default speed interval is a1 km/h to b1 km/h, when the speed information corresponding to the first change frame is greater than b1 km/h), it indicates that the initial frequency for key frame extraction cannot satisfy the current speed information of the video acquisition device, and the initial frequency for key frame extraction is increased. Alternatively, if the first change frame is detected and the speed information corresponding to the first change frame is less than a minimum value in the default speed interval (for example, less than a1 km/hour), it indicates that the initial frequency for key frame extraction has a surplus for the current speed information of the video acquisition device, and the initial frequency for key frame extraction is decreased.

Optionally, in the embodiments of the present disclosure, the speed information may be divided into different intervals, and different key frame extraction frequencies may be set for the different intervals. For example, when it is detected that the speed information corresponding to the first change frame is less than the minimum value in the default speed interval and the speed information corresponding to the first change frame belongs to a particular interval, the initial frequency for key frame extraction may be updated to the frequency for key frame extraction corresponding to that interval.

Optionally, in the embodiments of the present disclosure, the frequency for key frame extraction may be set to a first frequency when the speed information is 0; the frequency for key frame extraction may be set to a second frequency (that is, the default frequency for key frame extraction) when the speed information is within the default speed interval; the frequency for key frame extraction may be set to a third frequency when the speed information is a preset maximum speed value. When the speed information corresponding to the first change frame is greater than 0 and less than the minimum value of the default speed interval, the updated frequency for key frame extraction may be determined by calculating linear interpolation between the first frequency and the second frequency. When the speed information corresponding to the first change frame is greater than the maximum value of the default speed interval and less than the preset maximum speed value, the updated frequency for key frame extraction may be determined by calculating linear interpolation between the second frequency and the third frequency.

In an optional embodiment of the present disclosure, the method may further include:

Step S41: upon detection of a second change frame, determining a supplementary frame quantity according to direction information corresponding to the second change frame, where the second change frame refers to a frame of which a change in the direction information relative to a previous frame meets a preset condition; and Step S42: upon detection of the second change frame, add key frames of the supplementary frame quantity.

During the acquisition of the video signal, the video acquisition device may detect in real time whether a second change frame exists. Upon detection of the second change frame, which indicates that the video acquisition device has made a turn (for example, head turning and/or steering), a supplementary frame quantity is determined according to movement information corresponding to the second change frame. The second change frame refers to a frame of which a change in the direction information relative to a previous frame meets a preset condition. The preset condition is used to determine whether the direction change occurring at the second change frame meets a turning condition. For example, if an angle of the direction change is greater than a first preset value, it may be determined that head turning has occurred. In another example, if an angle of the direction change is greater than the first preset value and an angle of a movement direction change is greater than a second preset value, it may be determined that steering has occurred.

Upon detection of the second change frame, it may be determined that the video acquisition device has made a turn (including head turning and/or steering). When the video acquisition device makes a turn, the photographing scene may change significantly, and therefore additional key frames need to be added to accurately express scene information acquired during the turn. In the embodiments of the present disclosure, upon detection of the second change frame, a supplementary frame quantity is determined according to movement information corresponding to the second change frame, and key frames of the supplementary frame quantity are added.

Determining a supplementary frame quantity according to direction information corresponding to the second change frame may include: determining the supplementary frame quantity according to a change amount of the direction information corresponding to the second change frame relative to a previous frame. For example, a larger change amount indicates a larger angle of the turn, and accordingly more key frames may be added. That is, the supplementary frame quantity may be proportional to the change amount. The change amount may be measured by an angle formed between the direction information corresponding to the second change frame and the direction information of the previous frame, and a larger angle indicates a larger change amount.

Further, the supplementary frame quantity may be determined to be a first quantity for a determination that head turning occurs, and the supplementary frame quantity may be determined to be a second quantity for a determination that steering occurs. Optionally, due to the fact that the scene changes more significantly in steering than in head turning, the second quantity may be set to be greater than the first quantity. Upon detection of the second change frame, position information corresponding to the second change frame may also be obtained, to determine whether head turning or steering has occurred.

The method may further include: upon detection of the second change frame, obtaining position information corresponding to each frame within a preset time period after the second change frame, and determining, according to the second change frame and the position information corresponding to each frame within the preset time period after the second change frame, whether a movement direction of the video acquisition device has changed after the video acquisition device acquires the second change frame. If the movement direction of the video acquisition device has also changed, it may be determined that the video acquisition device steered at the time point of acquiring the second change frame. Otherwise, it may be determined that the video acquisition device only made a head turning at the time point of acquiring the second change frame.

Figure 2:
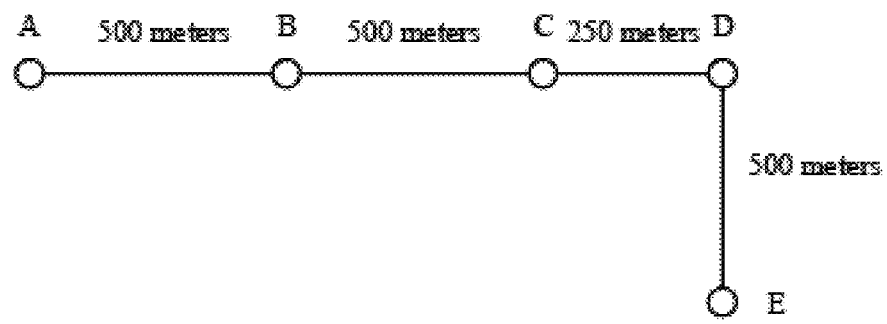
FIG. 2 is an example diagram of determining key frames during movement of a video acquisition device in the present disclosure.

Reference is made to FIG. 2, an example diagram of determining key frames during movement of a video acquisition device in the present disclosure is illustrated. In this example, the video acquisition device has three built-in hardware units, including an IMU, a gyrosensor, and a GPS. The IMU may be used to provide speed information of the video acquisition device. The gyrosensor may be used to provide direction information of the video acquisition device. The GPS may be used to provide position information of the video acquisition device.

As shown in FIG. 2, the video acquisition device moves from point A to point E between reception of an acquisition start instruction and reception of an acquisition end instruction by the video acquisition device. In this example, the video acquisition device receives the acquisition start instruction at point A, starts acquisition of a video signal in response to the acquisition start instruction, and records movement information corresponding to each frame during the acquisition of the video signal. In this case, the initial frequency for key frame extraction is set, which is assumed to be 53 frames/100 meters. During acquiring of the video signal by the video acquisition device, the speed information corresponding to each frame can be obtained in real time. Assuming that the speed information corresponding to each frame is within a default speed interval from point A to point B, key frames may be determined at the frequency for key frame extraction of 53 frames/100 meters for the video signal acquired during the movement of the video acquisition device from point A to point B. It may be understood that the key frames may be determined periodically during the movement from point A to point B. For example, a key frame may be determined every 10 meters of movement. Assuming that the distance from point A to point B is 500 meters, the video acquisition device may determine 5*53=265 key frames from the video signals acquired during the movement of the video acquisition device from point A to point B.

During the movement of the video acquisition device from point A to point B, if it is detected that the speed information changes and a video signal frame acquired at point B is less than the minimum value of the default speed interval (that is, the first change frame is detected at this point), the current frequency for key frame extraction may be reduced. For example, if the updated frequency for key frame extraction is determined as 27 frames/100 meters, key frames are periodically determined at the frequency for key frame extraction of 27 frames/100 meters from point B.

During the movement of the video acquisition device from point B to point C, if it is detected that a change in the direction information relative to the previous frame meets a preset condition (that is, in this case, the second change frame is detected), a supplementary frame quantity is determined according to the direction information corresponding to the second change frame, and key frames of the supplementary frame quantity are added. For example, if it is determined, according to the direction information corresponding to the second change frame, that the video acquisition device has turned head at point C, the supplementary frame quantity is determined to be a first quantity N1. Assuming that N1 is 10 frames, 10 key frames are therefore added at point C, and key frames are periodically determined at the frequency for key frame extraction of 27 frames/100 meters from point C.

During the movement of the video acquisition device from point C to point D, if it is detected that a change in the direction information relative to the previous frame meets the preset condition (that is, in this case, the second change frame is detected), a supplementary frame quantity is determined according to the direction information corresponding to the second change frame, and key frames of the supplementary frame quantity are added. For example, if it is determined, according to the second change frame and the position information corresponding to each frame within a preset time period after the second change frame, that the video acquisition device steered at point D, the supplementary frame quantity is determined to be a second quantity N2. Assuming that N2 is 15 frames, 15 key frames are therefore added at point D. Assuming that after the steering is made at point D, the video acquisition device detects that the speed information changes and the speed information reaches a default speed interval, the current frequency for key frame extraction is updated to 53 frames/100 meters, and key frames are periodically determined at the frequency for key frame extraction of 53 frames/100 meters from point D.

In a case that an acquisition end instruction is received when the video acquisition device moves from point D to point E, a video digest may be generated according to key frames determined from point A to point E. Specifically, 5*53=265 key frames may be extracted from point A to point B. Assuming that the distance from point B to point C is 500 meters, 5*27=135 key frames may be extracted from point B to point C. Assuming that the distance from point C to point D is 250 meters and 10 frames are added at point C, 2.5*27+10=77.5 frames may be extracted from point C to point D. In a case that the frame extracting quantity is a decimal, the value may be rounded up or down. For example, 77.5 frames are rounded up to 78 frames. Assuming that the distance from point D to point E is 500 meters and 15 frames are added at point D, a total of 5*53+15=280 frames are extracted from point D to point E. Therefore, a total of 265+135+78+280=758 key frames may be extracted from point A to point E.

In conclusion, the method for generating a video digest provided in the embodiments of the present disclosure is applicable to a video acquisition device. Upon receiving an acquisition start instruction, the video acquisition device starts acquisition of a video signal in response to the acquisition start instruction, and records movement information corresponding to each frame during the acquisition of the video signal, so as to determine a key frame in real time according to the movement information corresponding to each frame. After receiving an acquisition end instruction, the video acquisition device directly generates a video digest according to the determined key frames in response to the acquisition end instruction. In this process, it is not required to analyze the video signal frame by frame and extract video features. Therefore, computing complexity may be reduced, computation may be decreased, and efficiency of generation of the video digest may be improved. The problem of inaccurate feature extraction due to the video quality may also be avoided, and the quality of the generated video digest may be guaranteed. In addition, in the embodiments of the present disclosure, in determining the key frame real-time, the frequency for key frame extraction is dynamically determined according to the movement information of the video acquisition device, so that the dynamically determined frequency for key frame extraction is more consistent with variations of the movement of the video acquisition device, and the determination of the key frame may be more accurate, thereby further improving the quality of the generated video digest. Further, the key frame is determined in real time by the video acquisition device during acquisition of the video signal, so the video digest may be generated upon completion of the acquisition of the video signal. Compared with the method in which the video digest is generated offline by analyzing the video signal frame by frame after acquisition of the whole video signal is completed, the embodiments of the present disclosure allow online generation of the video digest and may satisfy a user demand for generating the video digest in real time.

It should be noted that, for simple description, each method embodiment has been described as a combination of a sequence of actions. However, a person skilled in the art should understand that the embodiments of the present disclosure are not limited by the described action order, because according to the embodiments of the present disclosure, some steps may be performed in another order or at the same time. Further, a person skilled in the art should also understand that the embodiments described in the specification are all preferred embodiments, and the related actions are not indispensable for the embodiments of the present disclosure.

Figure 3:
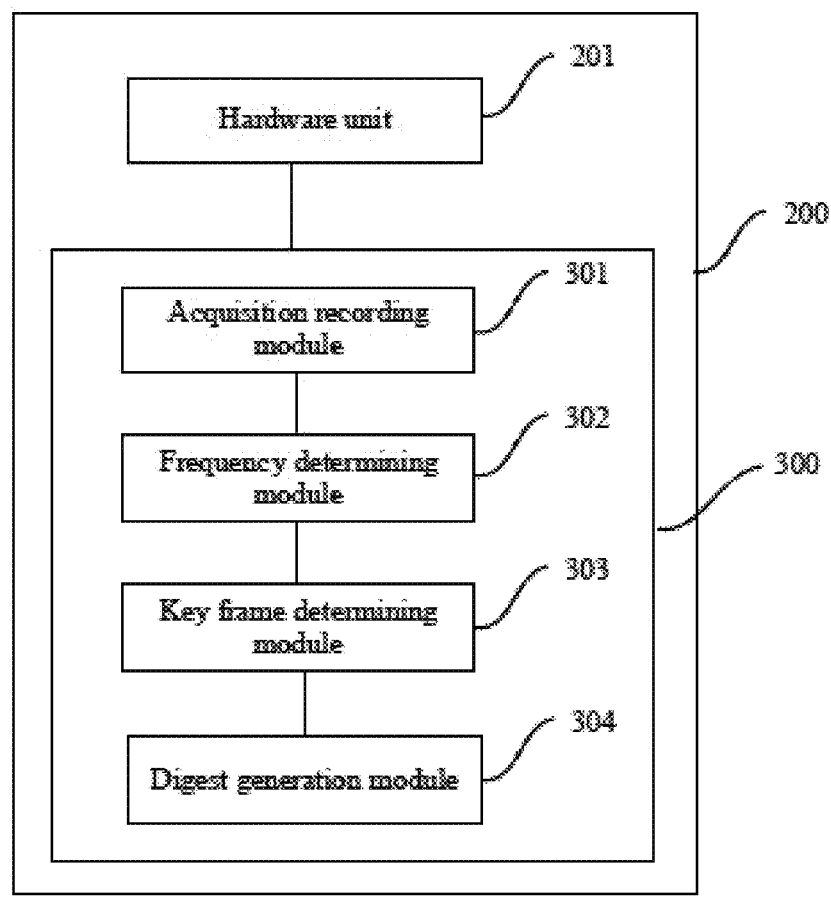
FIG. 3 is a structural block diagram of an apparatus for generating a video digest according to an embodiment of the present disclosure.

Referring to FIG. 3, a structural block diagram of an apparatus 300 for generating a video digest according to an embodiment of the present disclosure is illustrated. The apparatus 300 may be applied to a video acquisition device 200. The video acquisition device 200 includes a hardware unit 201 used to obtain movement information in real time. The movement information includes speed information and direction information of the video acquisition device. The apparatus 300 may include:

an acquisition recording module 301, configured to: in response to an acquisition start instruction, start acquisition of a video signal, and record movement information corresponding to each frame during the acquisition of the video signal;

a frequency determining module 302, configured to determine a frequency for key frame extraction according to the movement information corresponding to each frame;
a key frame determining module 303, configured to determine a key frame from the acquired video signal according to the frequency for key frame extraction; and
a digest generation module 304, configured to: in response to an acquisition end instruction, generate a video digest according to the key frame.

Optionally, the frequency determining module includes:
an information acquisition sub-module, configured to: when a preset cycle arrives, obtain movement information corresponding to each frame within the preset cycle; and
a frequency determining sub-module, configured to determine the frequency for key frame extraction within the preset cycle according to the movement information corresponding to each frame within the preset cycle.

Optionally, the key frame determining module includes:
a sub-module for determining a frame extracting quantity, configured to determine a frame extracting quantity within the preset cycle according to the preset cycle and the frequency for key frame extraction within the preset cycle; and
a sub-module for determining key frames, configured to determine, from a start frame to an end frame of the preset cycle, key frames of the frame extracting quantity.

Optionally, the preset cycle includes a preset time cycle or a preset distance cycle.

Optionally, the movement information further includes position information of the video acquisition device, and the preset distance cycle is determined according to position information corresponding to each frame.

Optionally, the frequency determining module includes:
an initial determining sub-module, configured to set an initial frequency for key frame extraction, which corresponds to a default speed interval; and
a frequency updating sub-module, configured to: upon detection of a first change frame, update the initial frequency for key frame extraction according to speed information corresponding to the first change frame, where the first change frame refers to a frame of which the speed information goes outside of the default speed interval.

Optionally, the frequency updating sub-module includes:
a first updating sub-module, configured to: if the speed information corresponding to the first change frame is greater than a maximum value in the default speed interval, increase the initial frequency for key frame extraction; or,
a second updating sub-module, configured to: if the speed information corresponding to the first change frame is less than a minimum value in the default speed interval, decrease the initial frequency for key frame extraction.

Optionally, the apparatus further includes:
a module for determining a supplementary frame quantity, configured to: upon detection of a second change frame, determine a supplementary frame quantity according to direction information corresponding to the second change frame, where the second change frame refers to a frame of which a change in the direction information relative to a previous frame meets a preset condition; and
a key frame supplementing module, configured to: upon detection of the second change frame, add key frames of the supplementary frame quantity.

The apparatus for generating the video digest provided in the embodiments of the present disclosure is applicable to a video acquisition device. Upon receiving an acquisition start instruction, the video acquisition device starts acquisition of a video signal in response to the acquisition start instruction, and records movement information corresponding to each frame during the acquisition of the video signal, so as to determine a key frame in real time according to the movement information corresponding to each frame. After receiving an acquisition end instruction, the video acquisition device directly generates the video digest according to the determined key frames in response to the acquisition end instruction. In this process, it is not required to analyze the video signal frame by frame or extract video features. Therefore, computing complexity may be reduced, computation may be decreased, and efficiency of generation of the video digest may be improved. The problem of inaccurate feature extraction due to the video quality may also be avoided, and the quality of the generated video digest may be guaranteed. In addition, in the embodiments of the present disclosure, in determining the key frame real-time, the frequency for key frame extraction is dynamically determined according to the movement information of the video acquisition device, so that the dynamically determined frequency for key frame extraction is more consistent with variations of the movement of the video acquisition device, and the determination of the key frame may be more accurate, thereby further improving the quality of the generated video digest. Further, the key frame is determined in real time by the video acquisition device during acquisition of the video signal, so the video digest may be generated upon completion of the acquisition of the video signal. Compared with the method in which the video digest is generated offline by analyzing the video signal frame by frame after acquisition of the whole video signal is completed, the embodiments of the present disclosure allow online generation of the video digest and may satisfy a user demand for generating the video digest in real time.

Since the apparatus embodiment is basically similar to the method embodiments, the description is relatively simple. For relevant parts, reference may be made to the portions of the description of the method embodiments.

Each embodiment in the specification is described in a progressive manner. Each embodiment focuses on a difference from other embodiments. The same or similar parts between the embodiments may be referred to each other.

For the apparatus in the above embodiments, a specific manner in which the modules perform operations has been described in detail in the method embodiments, and is not repeatedly described in detail herein.

An embodiment of the present disclosure further provides a non-transitory computer-readable storage medium. Instructions in the storage medium, when executed by a processor of an apparatus (a server or a terminal), cause the apparatus to perform the description of the method for generating a video digest in the embodiments corresponding to FIG. 1, which is not repeatedly described herein. In addition, description of beneficial effects of using the same methods is not repeatedly described herein. For technical details not disclosed in the embodiment of the computer program product or computer program involved in this application, reference may be made to the description of the method embodiments of this application.

A person skilled in the art may easily figure out other implementations of the present disclosure after considering the specification and practicing the present invention disclosed herein. The present disclosure is intended to cover any variations, use, or adaptive changes of the present disclosure, which comply with general principles of the present disclosure, and include common general knowledge or common technical means in the technical field that are not disclosed in the present disclosure. The specification and embodiments are merely considered to be exemplary, and an actual scope and spirit of the present disclosure are indicated in the following claims.

It should be understood that the present disclosure are not limited to the precise structures described above and shown in the accompanying drawings. Various modifications and changes can be made without departing from the scope of the present disclosure. The scope of the present disclosure is limited only by the attached claims.

The above are merely preferred embodiments of the present disclosure, which are not intended to limit the present disclosure. Any modification, equivalent replacement, improvement, and the like made within the spirit and principles of the present disclosure should fall within the protection scope of the present disclosure.

A method and an apparatus for generating a video digest, and a machine-readable storage medium provided in the present disclosure have been described in detail above. The principles and embodiments of the present disclosure are described in detail via specific embodiments. The description of the above embodiment is only used to help understand the method of the present disclosure and its core idea. Meanwhile, for a person of ordinary skill in the art, there can be changes in the specific embodiments and the application scope according to the idea of the present disclosure. In conclusion, the content of the present specification should not be construed as a limitation to the present disclosure.

What is claimed is:

1. A method for generating a video digest, wherein the method is applied to a video acquisition device, the video acquisition device comprises a hardware unit configured to obtain movement information in real time, and the movement information comprises speed information and direction information of the video acquisition device, the method comprising:
    starting acquisition of a video signal in response to an acquisition start instruction, and recording movement information corresponding to each frame during the acquisition of the video signal;
    determining a frequency for key frame extraction according to the movement information corresponding to each frame;
        wherein when the movement information comprises the speed information describing a speed at which the video acquisition device is moving, the frequency for key frame extraction is proportional to the speed information; and
        wherein when the movement information comprises direction information describing a direction in which the video acquisition device is moving and head turning and/or steering is determined to have occurred according to a change of the direction information, the frequency for key frame extraction is increased;
    determining a key frame from the acquired video signal according to the frequency for key frame extraction without analyzing frames of the video signal to extract video features; and
    in response to an acquisition end instruction, generating a video digest according to the key frame.

2. The method according to claim 1, wherein the determining a frequency for key frame extraction according to the movement information corresponding to each frame comprises:
    when a preset cycle arrives, obtaining movement information corresponding to each frame within the preset cycle; and
    determining a frequency for key frame extraction within the preset cycle according to the movement information corresponding to each frame within the preset cycle.

3. The method according to claim 2, wherein the determining a key frame from the acquired video signal according to the frequency for key frame extraction comprises:
    determining a frame extracting quantity within the preset cycle according to the preset cycle and the frequency for key frame extraction within the preset cycle; and
    determining, from a start frame to an end frame of the preset cycle, key frames of the frame extracting quantity.

4. The method according to claim 2, wherein the preset cycle comprises a preset time cycle or a preset distance cycle.

5. The method according to claim 4, wherein the movement information further comprises position information of the video acquisition device, and the preset distance cycle is determined according to the position information corresponding to each frame.

6. The method according to claim 1, wherein determining a frequency for key frame extraction according to the movement information corresponding to each frame comprises:
    setting an initial frequency for key frame extraction, which corresponds to a default speed interval; and
    upon detection of a first change frame, updating the initial frequency for key frame extraction according to speed information corresponding to the first change frame, wherein the first change frame refers to a frame of which the speed information goes outside of the default speed interval.

7. The method according to claim 6, wherein updating the initial frequency for key frame extraction according to speed information corresponding to the first change frame comprises:
    in response to the speed information corresponding to the first change frame being greater than a maximum value in the default speed interval, increasing the initial frequency for key frame extraction; or
    in response to the speed information corresponding to the first change frame being less than a minimum value in the default speed interval, decreasing the initial frequency for key frame extraction.

8. The method according to claim 1, further comprising:
    upon detection of a second change frame, determining a supplementary frame quantity according to direction information corresponding to the second change frame, wherein the second change frame refers to a frame of which a change in the direction information relative to a previous frame meets a preset condition; and
    upon detection of the second change frame, adding key frames of the supplementary frame quantity.

9. An apparatus for generating a video digest, comprising:
    one or more processors; and
    non-transitory machine-readable storage medium, having instructions stored thereon, the instructions, when executed by the one or more processors of the apparatus, causing performance of the method according to claim 1.

10. A non-transitory machine-readable storage medium, having instructions stored thereon, the instructions, when executed by one or more processors of an apparatus, causing the apparatus to perform the method for generating a video digest according to claim 1.

\* \* \* \* \*